United States Patent [19]
Smith et al.

[11] 3,789,410
[45] Jan. 29, 1974

[54] PASSIVE RANGING TECHNIQUE

[75] Inventors: Lloyd M. Smith, Canoga Park;
Kanji Frank Sayano, Sepulveda,
both of Calif.

[73] Assignee: The United States of America as represented by the Secretary of the Navy, Washington, D.C.

[22] Filed: Jan. 7, 1972

[21] Appl. No.: 216,300

[52] U.S. Cl............................................. 343/112 D
[51] Int. Cl.............................................. G01s 5/14
[58] Field of Search............. 343/112 D; 235/150.27

[56] References Cited
UNITED STATES PATENTS

| 3,090,957 | 5/1963 | Albanese et al. | 343/112 D |
| 3,378,842 | 4/1968 | Phillips | 343/112 D |

Primary Examiner—Maynard R. Wilbur
Assistant Examiner—Richard E. Berger
Attorney, Agent, or Firm—R. S. Sciascia; Roy Miller

[57] ABSTRACT

A system for passively determining range to a threat emitter from a single tactical vehicle based upon the change in the difference of phase of a radio frequency carrier between two physically spaced antennas.

5 Claims, 6 Drawing Figures

PASSIVE RANGING TECHNIQUE

BACKGROUND OF THE INVENTION

1. Field of the Invention

The present invention relates to a passive ranging system pertinent to tactical missions. The areas of greatest concern in such a system relate to accuracy and response time as a function of range, angle, frequency and antenna orientation.

2. Description of the Prior Art

U.S. Pat. Nos. 2,592,459, 2,646,564, 2,668,288 to Perilhou and 2,760,190 to Henrici disclose radio frequency systems for distance measurement to an emitting source. The systems illustrate the use of a triangulation scheme incorporating at least two antennas at widely spaced points on an aircraft or dirigible fuselage and/or wings. However, none of the systems disclose the use of a phase rate ranging system.

SUMMARY OF THE INVENTION

The passive ranging technique which will be subsequently disclosed is based upon the rate of change in phase difference between two signals received by widely separated pairs of antennas on an aircraft. Such antennas may be located on the aircraft wingtips, or along the wings, for a forward-looking ranging system, or on the fuselage, e.g., on the nose and tail, for a side-looking system. These antenna pairs, or arrays, are used to receive signals from either ground or airborne emitters.

The signals received by each antenna in the array are identical in frequency but slightly different in phase due to the angle of intercept. As the aircraft moves in relation to the emitter, this relative difference in phase changes due to the rotational effects of the emitter as referenced to the direction of travel of the antenna array. It is the rate of the change in phase difference which yields the information required for passive ranging.

DESCRIPTION OF THE PREFERRED EMBODIMENT

Figure 1:
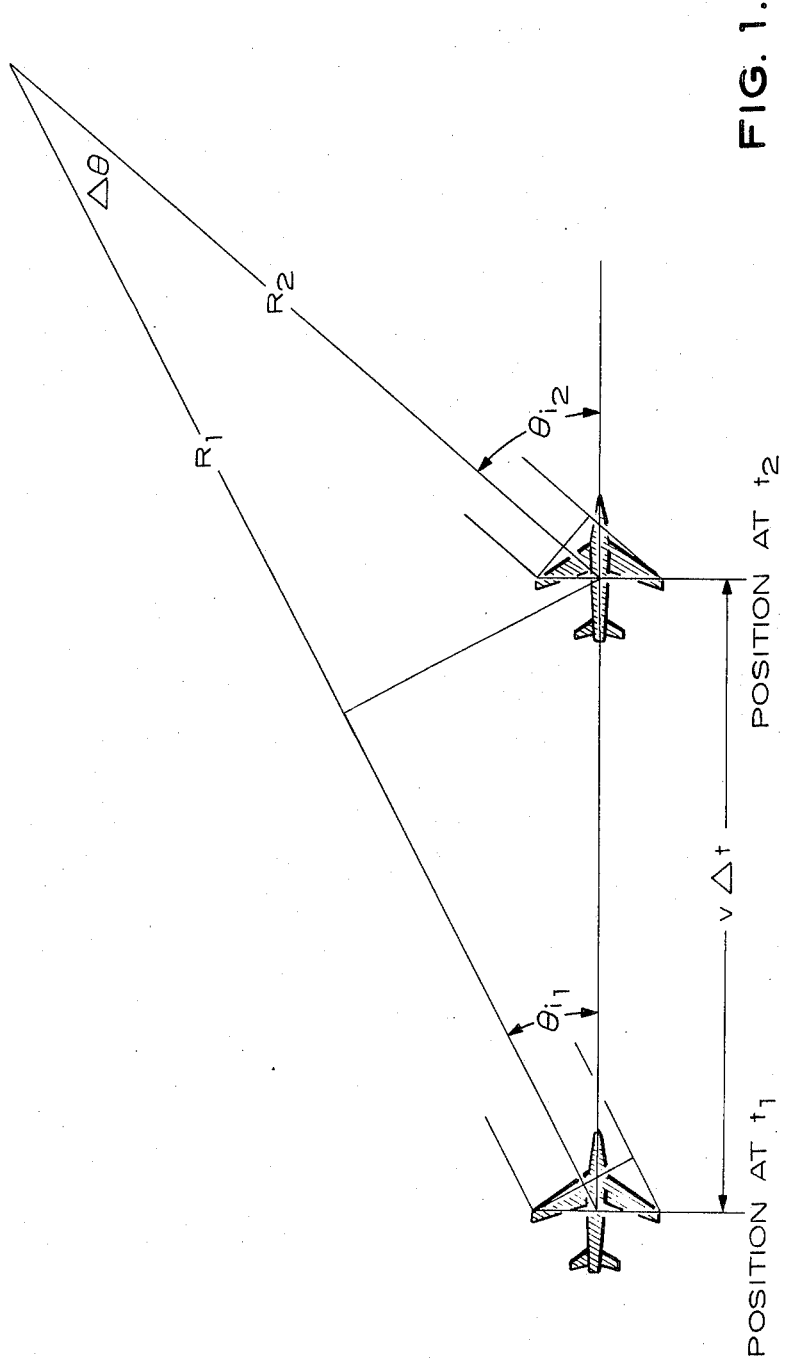
FIG. 1 illustrates the passive ranging geometry.
Figure 2:
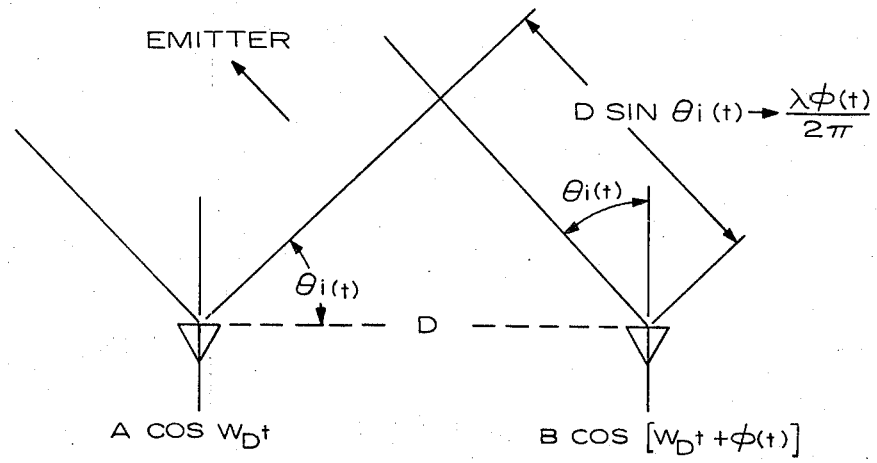
FIG. 2 illustrates the geometry at the antennas in the system and resultant outputs.

Ranging in the present system is performed in accord with the geometry shown in FIG. 1. Range information is extracted from the received signals by combining the two antenna outputs via RF circuitry which will be explained subsequently. FIG. 2 illustrates the signals, the mathematical expressions existing at the two separated antennas, and the resultant at the outputs thereof.

THE RANGING EQUATION

The ranging equation for the phase rate ranging technique is given below as equation 1.

$$(R = V \Delta T \sin(\theta_i + \theta_d - \Delta\theta)/\sin \Delta\theta \tag{1}$$

where $$\sin \Delta\theta = \pm\{[0.984/Df_c|\cos(\theta_i - \theta_a)|] - (1 - \cos\Delta\theta)\tan(\theta_i - \theta_a)\}; \tag{2}$$

$v$ = ground velocity of aircraft (naut mi/sec);
$\Delta T$ = full cycle ranging time (sec);
$\theta_i$ = intercept angle of emitter signal from aircraft nose (deg);
$\theta_d$ = drift angle of aircraft from ground velocity vector to aircraft nose (deg);
$\Delta\theta = \theta_2 - \theta_1$;
$\theta_a$ = angle of antenna array normal from aircraft nose (deg);
$D$ = antenna spacing (ft);
$f_c$ = emitter frequency (GHz);
$R$ = emitter range from the aircraft (naut mi) and
$0.984$ = speed of light (ft/nsec)

Figure 3:
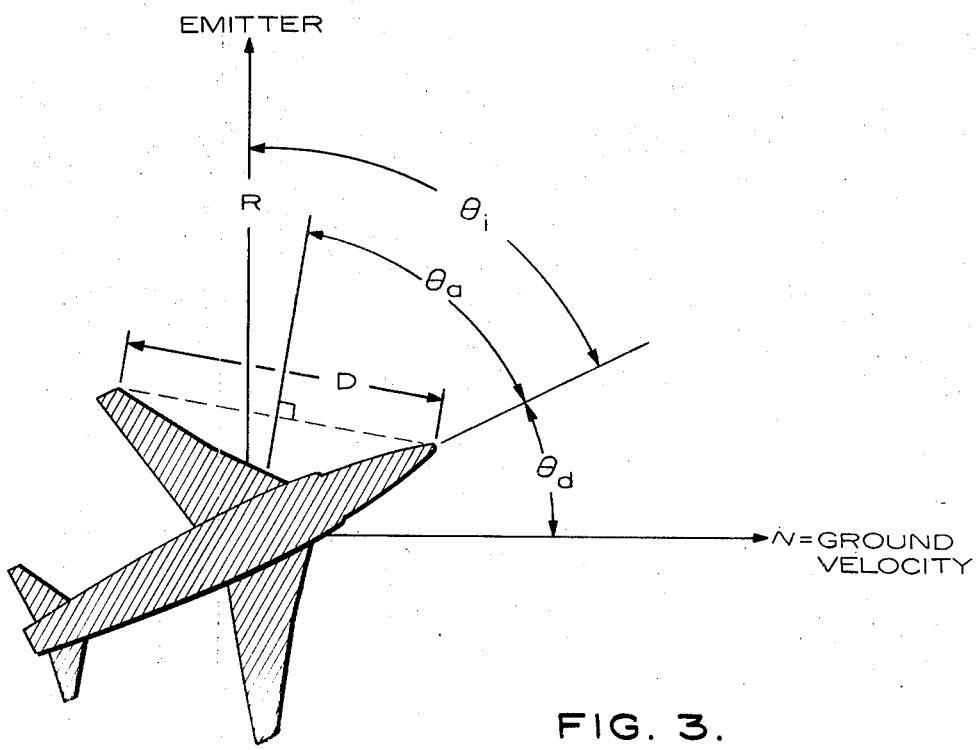
FIG. 3 is another figure illustrating the geometrical relationships.

The geometrical relationship of the above parameters is illustrated in FIG. 3. The angles are assigned their respective signs in the conventional manner $\theta_a$ and $\theta_i$ are assumed positive when they are measured counter-clockwise from the aircraft nose. $\theta_d$ is also assumed to be positive when it is measured counter-clockwise from the velocity vector. When the angles are measured clockwise, they are assumed to be negative. The sign of $\Delta\theta$ and $\sin \Delta\theta$ is assigned in accordance with the location of the emitter with respect to the aircraft velocity vector.

Thus, from the above stated convention, the signs of $\Delta\theta$ and $\sin \Delta\theta$ are positive when the emitter is located to the left of the aircraft velocity vector. Conversely, $\Delta\theta$ and $\sin \Delta\theta$ are negative when the emitter is located to the right of the velocity vector.

An acceptable approximation is realized by dropping the last term in Equation 2. The resulting approximation is stated as Equation 3.

$$\sin \Delta\theta = \pm 0.984/[Df_c|\cos(\theta_i - \theta_a)|] \tag{3}$$

In considering the forward-looker case, $\Delta_a = 0°$ and $$\sin \Delta\theta = \pm 0.984/[Df_c|\cos \theta_i|] \tag{4}$$

For the side-looker case, $\theta_a = 90°$ and
$$\sin \Delta\theta = \pm 0.984/[Df_c|\sin \theta_i|] \tag{5}$$

In order to calculate range with the Phase-Rate Ranging technique, it is necessary to measure (or have available data on) the emitter frequency ($f_c$), intercept angle ($\theta_i$), the true aircraft ground velocity ($v$), and the drift angle ($\theta_d$). The aircraft velocity and the drift angle are obtained from the (inertial or doppler) navigation equipment, the carrier frequency and the intercept angle may be determined with a DF or homing and warning system. Alternatively, the intercept angle as well as the frequency can also be determined with subsystems within the overall PRR system.

The system is described in terms of an analogue equipment however, it is to be understood that a digital system could as well be used. The system uses a single frequency band utilizing analogue techniques for computation and display of information, however the design could be expanded to other frequency bands and to more sophisticated data processing and display with a minimum of modification.

Figure 4:
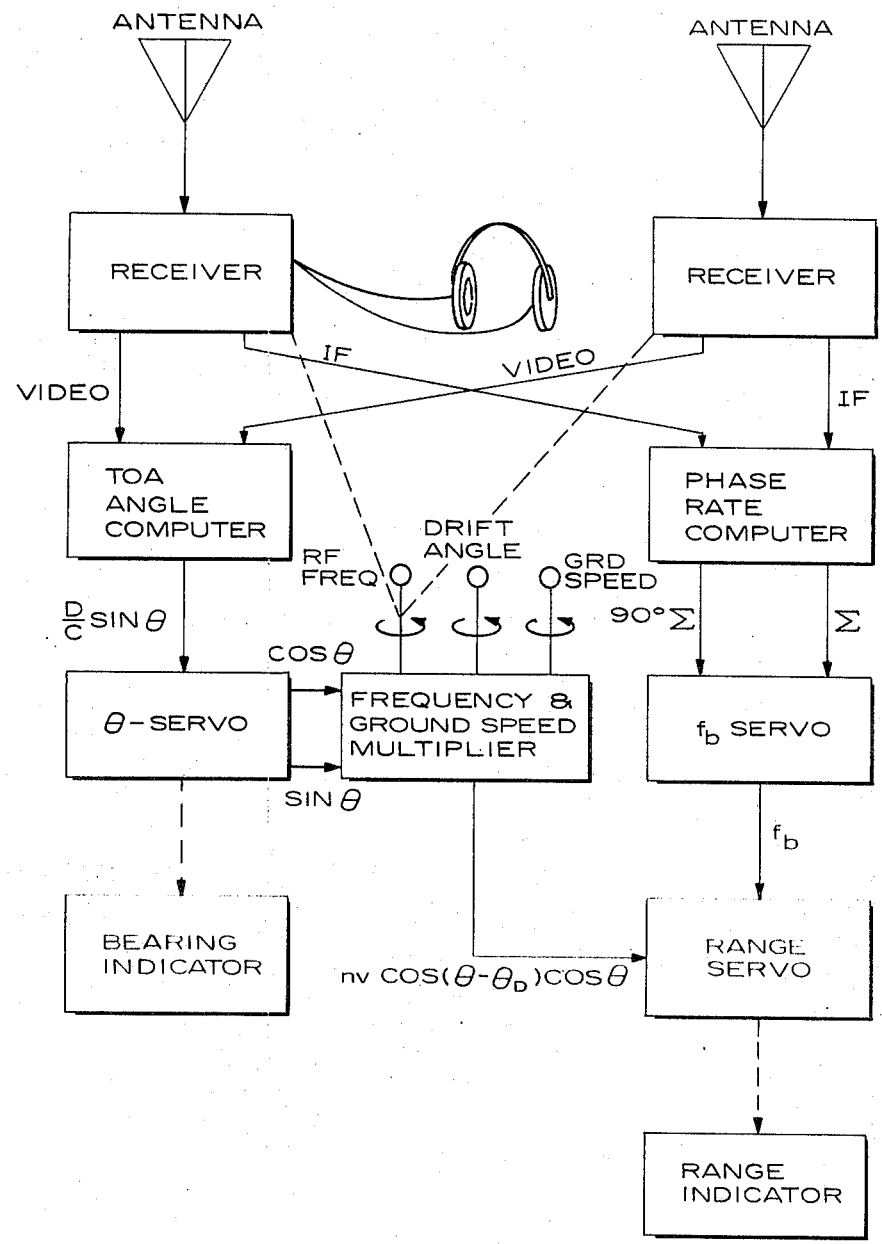
FIG. 4 is a block diagram of one embodiment of the invention.

The simplified block diagram of FIG. 4 illustrates the functional components of the basic system. Again, although an analogue method is used for a solution of the system equations, the equations are the same as would be solved by a general purpose digital computer. The analogue approach is competitive with a digital approach for a concerned environment of less than approximately 10 emitters after which the digital processor becomes more cost effective.

The system features two channels, one channel for the bearing or direction finding, DF, measurement and one for the range measurement. True bearing of the emitter is also provided. The earphones shown in FIG. 4 are used for emitter identification and acquisition.

The bearing channel uses the video pulse outputs of two X-band receivers for generating the time difference of arrival, $\Delta t$, of the two pulses. The measurement of $\Delta t$ and conversion of its value into an analogue voltage amplitude, $E_\theta$, is performed by the time of arrival angle computing section which has as its output:

$$E_\theta = \Delta t = (D/C) \sin \theta \qquad (6)$$

where
  $D$ = spacing of antennas;
  $c$ = velocity of light; and
  $\theta$ = angle off boresight.

The analogue signal is converted to a shaft position by the $\theta$-servo which has a mechanical counter on its output shaft for readout of the bearing angle. Also mounted on the output shaft are a differential synchro for obtaining true bearing angle of the emitter and a resolver for obtaining $\sin \theta$ and $\cos \theta$ which are used in the range computation.

Figure 5:
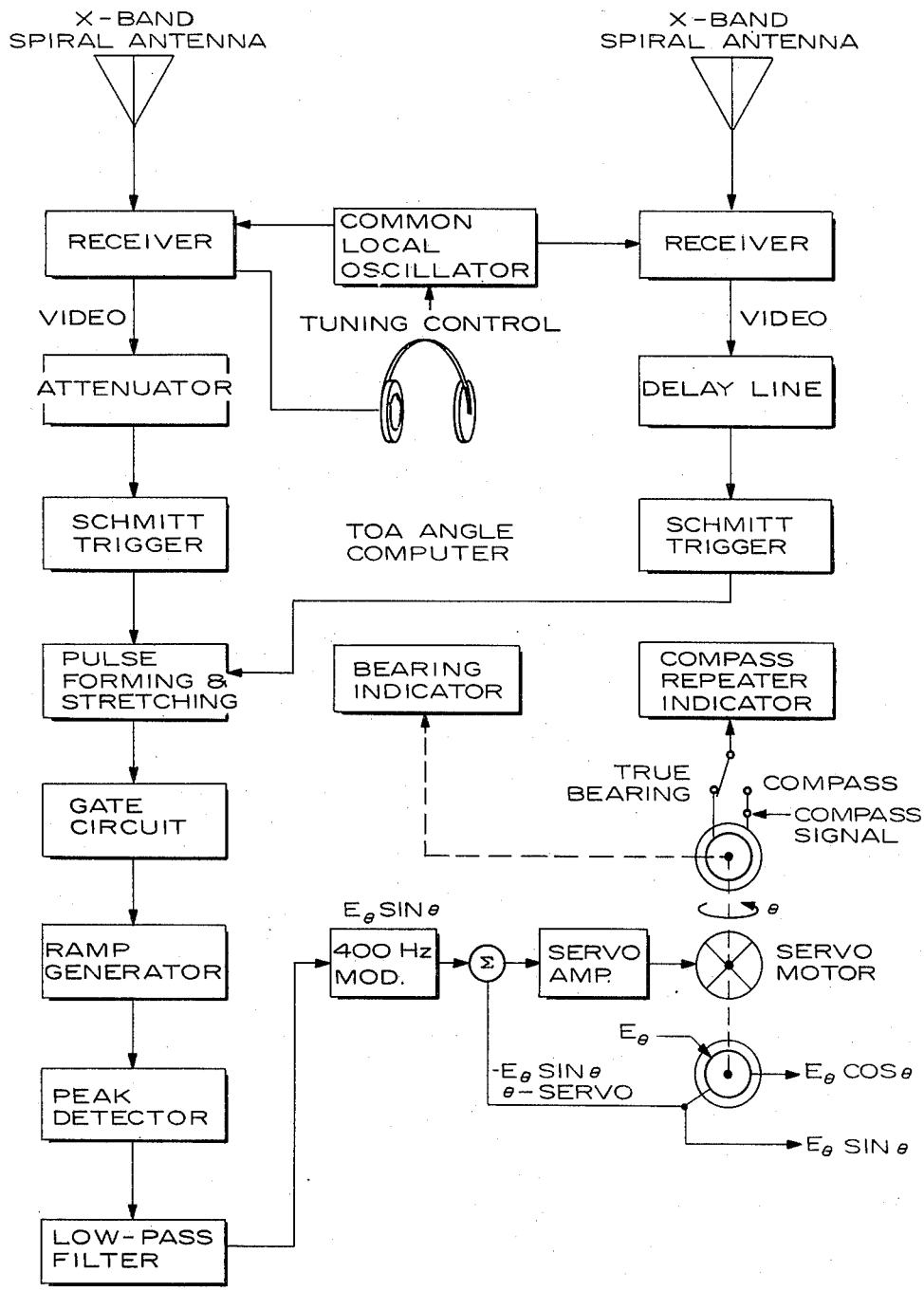
FIG. 5 is a block diagram of the relative bearing channel.

A detailed block diagram of the bearing channel is set forth in FIG. 5. The common local oscillator (LO) is utilized for the passive ranging measurement. The earphones are used by the flight operator to acquire the emitter while tuning to the emitter's assigned frequency. When flight conditions experience two or more emitters simultaneously transmitting within the IF passband of the receivers, the earphones can be used for monitoring and controlling the DF sorting process required to separate the emitters. No DF sorting circuits are shown, however, these may be added as desired.

The video pulse outputs of the receivers are initially processed by the TOA DF circuits and feed the gate circuit as shown. The output of the gate is a stretched pulse with its width, $T$, proportional to the time-of-arrival difference between the two video pulses.

The pulse width, $T$, is converted to an analogue voltage, $E_\theta$, by a ramp generator and peak detector. The output of the peak detector, smoothed by a low-pass filter, is modulated with a 400 Hz reference signal prior to conversion to a shaft position by the $\theta$-servo. The synchro resolver mounted on the output shaft of the $\theta$-servo provides a feedback signal proportional to $\sin \theta$ thereby driving the servo output shaft to an angle equal to the angle off boresight, $\theta$. The dynamic equation solved by the servo is:

$$(E_\theta \sin \theta)_{signal} - (E_o \sin \theta)_{feedback} = 0. \qquad (7)$$

The time delay introduced by the delay line at the output of one of the receivers introduces an equivalent offset angle into the antenna boresight position. This is compensated for by rotating the stator of the feedback resolver an equivalent number of degrees. The procedure is simple and readily accomplished in pre-flight calibration and alignment as follows:

a. locate a test signal at antenna boresight;
b. if the antennas are located on the starboard side of the aircraft, rotate the synchro resolver case until the relative bearing indicator reads 090.0°. If the antennas are on the port side, the required reading is 270.0°; for forward-looking antennas, 000.0°; and
c. lock the synchro stator in place.

This procedure also transforms the angle off boresight, $\theta$, into a relative bearing with respect to the airframe. The calibration of the analogue reference voltage, $E_\theta$, is done prior to the boresight alignment. The $E_\theta$ adjustment is accomplished by locating two test signals at ±45° from mechanical boresight. The magnitude of $E_\theta$ is then adjusted until a total swing of 90.0° on the indicator is obtained when reception is transfered from one test signal to the other. Following the $E_\theta$ adjustment, the boresight alignment described above is done, thereby removing, via calibration, any difference between electrical zero and mechanical zero. The $E_\theta$ adjustment is accomplished by setting a potentiometer at the output of the 400 Hz modulator. It can also be accomplished by adjusting the synchro resolver exertation voltage. The exact equation computed by the servo is then:

$$E_\theta \sin (\theta + \theta_D + \theta_R)_S - E_\theta \sin (\theta + \theta_D + \theta_R)_F = 0 \qquad (8)$$

where
  $S$ = signal term;
  $F$ = feedback term;
  $\theta_D$ = equivalent angle off boresight of the fixed time delay difference between receiver channels and;
  $\theta_R$ = relative bearing of antenna boresight with respect to the longitudinal axis of the test aircraft [$\pm(\pi/2)$ or 0°].

True bearing of the emitter is obtained by mounting a differential synchro transmitter (TDX) on the servo output shaft. The compass synchro signal is passed through the TDX which in turn drives a compass repeater indicator to obtain the true bearing reading. Alignment of the TDX is similar to that of the synchro resolver and is done after the relative bearing alignment.

The range channel uses the intermediate frequency (IF) outputs from the two receivers for obtaining the phase rate signal. In the present embodiment, a sum signal, $\Sigma$, and a quadrature sum signal, $90° \Sigma$, are obtained on each received pulse. For a train of pulses, the modulation envelope for both sum signals contains the phase rate beat frequency, $f_b$ where $[f_b = 1]/\Delta T)$. However, the two amplitude-detected envelopes are 90° out of phase with respect to each other; thereby providing two quadrature signals which simplifies the analog computation of $f_b$ in the $f_b$ servo. The output of the $\theta$-servo from the bearing channel is modified for antenna spacing, $n$; drift angle, $d$ and ground speed, $v$. The resultant signal is then combined with the output of the $f_b$ servo in a range servo to provide range which is read out on a mechanical counter mounted on the range servo output shaft.

Figure 6:
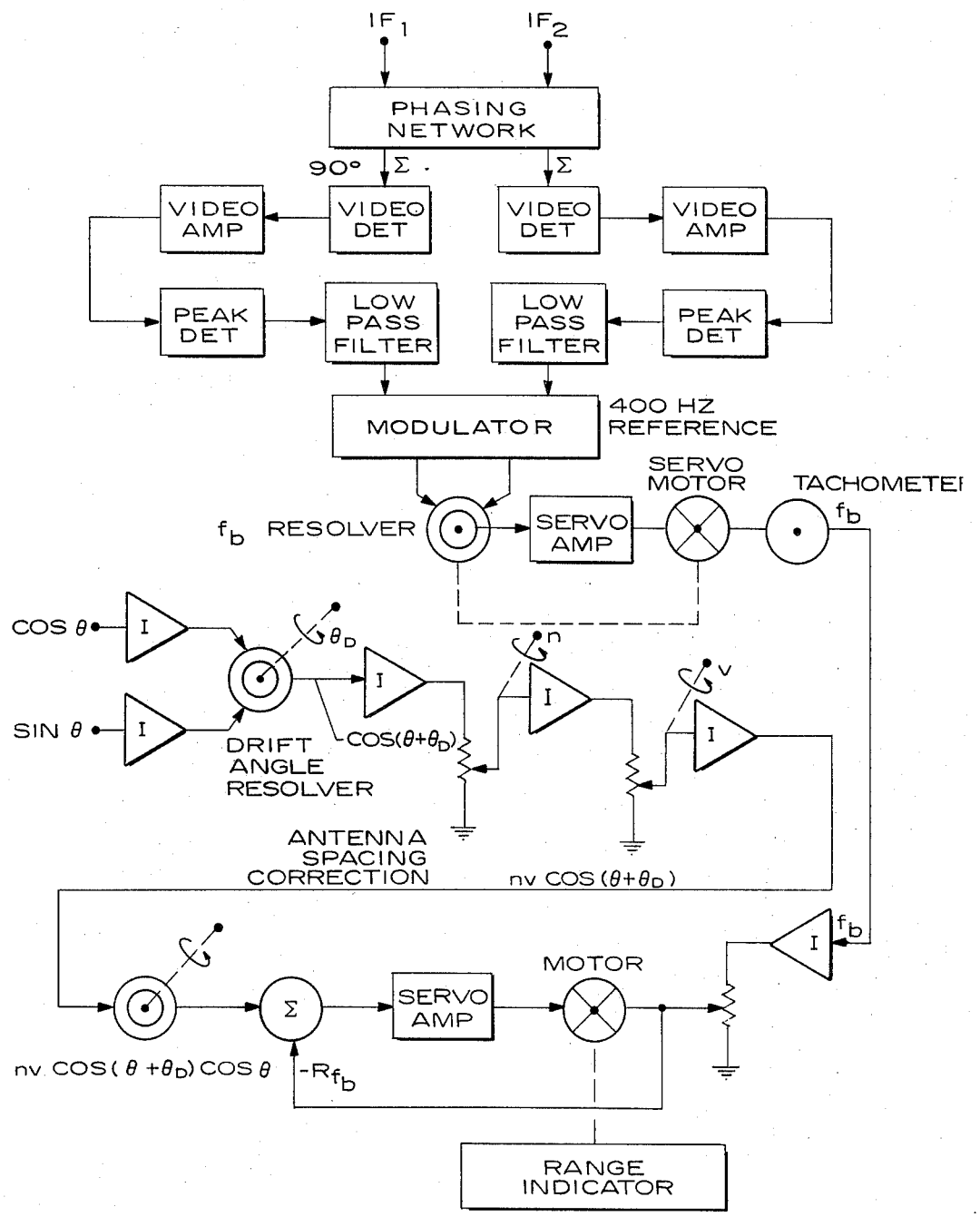
FIG. 6 is a range channel block diagram.

The detailed block diagram of the range channel is shown in FIG. 6. The incoming IF signals are processed by a passive phasing network to produce a sum, $\Sigma$, signal and a quadrature sum 90° $\Sigma$, signal. These two processed IF signals are detected and amplified by video circuits and the pulse train is peak detected to produce the amplitude modulation envelope of the two signals $\Sigma$ and 90° $\Sigma$. The smoothed signals out of the filters are analog DC signals of maximum amplitude $E_R$, which can be represented as follows:

$$\Sigma = E_R \sin 2\pi f_b t \quad \text{and} \tag{9}$$

$$90° \Sigma = E_R \sin [2\pi f_b t + (\pi/2)] = E_R \cos 2\pi f_b t \tag{10}$$

where $t$ = time in seconds.

The two signals are modulated at 400 Hz and fed to the two input windings of a synchro resolver. The output of the resolver is driven to a vanishing small error signal by action of the $f_b$-servo motor driving the resolver rotor to a null position. At null, the output shaft of the $f_b$-servo is at an angle corresponding to the instantaneous value of the angle ($2\pi f_b t \Sigma$). The quadrature signals fed to the resolver normalize the value of $E_R$ within the dynamic range limits of the servo. That is, at null, the servo solves the equation:

$$E_R \sin \omega_b t - E_r \cos \omega_b t = 0 = \sin \omega_b t - \cos \omega_b t. \tag{11}$$

As the input signals change with time, the $f_b$-servo will follow the input signal envelope at a velocity of $\omega_b = 2\pi f_b$. A tachometer mounted on the servo motor output shaft generates an output voltage, $E_T$ directly proportional to the $f_b$-servo velocity and hence:

$$E_T = f_b \tag{12}$$

where = a normalizing constant including the tachometer voltage gradient.

At the same time that $f_b$ is being computed, the $\sin \theta$ and $\cos \theta$ terms from the $\theta$-servo are processed to obtain the rest of the terms required for the solution of the range equation. As shown in FIG. 6, the $\sin \theta$ and $\cos \theta$ terms are supplied to the input windings of the drift angle, $\theta_D$, resolver through a dual channel isolation amplifier. The aircraft drift angle is set into the resolver rotor by the flight operator immediately before a range reading is taken. The output of the resolver is:

$$\cos \theta \cos \theta_D - \sin \theta \sin \theta_D = \cos (\theta + \theta_D). \tag{13}$$

The term is then multiplied by the antenna spacing factor, $n$, with a potentiometer which is adjusted by the flight operator. The $n$-potentiometer dial is calibrated in radio frequencies so that the operator adjusts the dial to read the same frequency that he reads from the receivers after tuning in the emitter. The relationship of $n$ to radio frequency, $f$, is: $n = D/\lambda = (Df/c = f$ (14)

where
  $D$ = antenna spacing in feet;
  $\lambda$ = input signal wavelength in feet;
  $c$ = velocity of light in feet per second; and
  = normalizing constant representing the trim value for the $n$-potentiometer.

The resultant signal, $n \cos (\theta + \theta_D)$, is then multiplied by the aircraft ground speed, $v$. The value of $v$ is also set by the operator just prior to taking a reading. Finally, the term is multiplied by $\cos \theta$ in a second resolver mounted on the $\theta$-servo output shaft to produce the computed term ($nv \cos (\theta + \theta_D) \cos \theta$) for input to the range servo. From the range equations:

$$nv \cos (\theta + \theta_D) \cos \theta = Rf_b. \tag{15}$$

By exciting the feedback potentiometer of the range servo with $f_b$, the servo will drive to a null such that:

$$nv \cos (\theta + \theta_D) \cos \theta - Rf_b = 0 \tag{16}$$

which means that the arm of the feedback potentiometer is at an analog value proportional to range, $R$. Therefore, the output shaft of the servo in representative of the instantaneous value of range as indicated by the range indicator mounted thereon.

What is claimed is:

1. Apparatus for passively measuring range to a radiating source comprising;
   at least two physically separated antenna means for receiving signals from a radiating source;
   receiver means operatively connected to said at least two antenna means for producing output video signals and intermediate frequency signals, or RF signals;
   time of arrival computing means operatively connected to said receiver means and receiving said video signals and measuring the difference in time of arrival between the signals received at said at least two antenna means and producing a signal corresponding to bearing to the source;
   phase rate computer means operatively coupled to the output of said receiver means for receiving the intermediate frequency (or RF) signals therefrom and producing a sum signal and a quadrature sum signal each signal having a modulation envelope containing phase rate beat frequency information $f_b = 1/\Delta T$;
   means operatively connected to said phase rate computer means and receiving said sum signal and said quadrature signal for computing a phase rate beat frequency voltage $E_t = Kf_b$ where K is a normalizing constant;
   modifying means operatively receiving the bearing signal and modifying said bearing signal for various measured parameters;
   and combining means operatively connected to said modifying means and said phase rate computing means for combining said modified bearing signal and said phase rate beat frequency and outputting a signal representative of range to the emitting source.

2. Apparatus for passively measuring range to a radiating source as set forth in claim 1 and further including;
   bearing indicator means operatively connected to said time of arrival means for indicating the bearing to the radiating source.

3. Apparatus for passively measuring range to a radiating source as set forth in claim 1 and further including;
   bearing servo means operatively connected to the time of arrival means for receiving the signal therefrom and outputting a signal indicative of bearing to the radiating source and further outputting signals corresponding to $\cos \theta$ and $\sin \theta$;
   said signals corresponding to $\cos \theta$ and $\sin \theta$ being inputted to said modifying means such that the modifying means receives the bearing signal in the form of $\sin \theta \cos \theta$.

4. Apparatus for passively measuring range to a radiating source as set forth in claim 1 wherein;

said modifying means modifies said bearing signal for antenna spacing, drift angle and ground speed.

5. Apparatus for passively measuring range to a radiating source as set forth in claim 1 and further including;

drift angle resolver means operatively coupled between the bearing servo means and said modifying means and receiving the sin $\theta$ cos $\theta$ terms;

drift angle adjusting means for setting the drift angle into the resolver rotor before a range reading is taken;

multiplier means coupled to the output of said drift angle resolver means for multiplying the output of the drift angle resolver by an antenna spacing factor;

said antenna spacing factor being inputted by a potentiometer which is adjusted to correspond to the antenna spacing;

other potentiometer means connected between said drift angle resolver means and said modifying means to input speed such that the signal resulting from the drift angle resolver means is multiplied thereby.

* * * * *